United States Patent
Krucinski

(10) Patent No.: US 8,762,103 B2
(45) Date of Patent: Jun. 24, 2014

(54) SHEET THICKNESS MEASUREMENT APPARATUS

(75) Inventor: Martin Krucinski, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 171 days.

(21) Appl. No.: 12/878,692

(22) Filed: Sep. 9, 2010

(65) Prior Publication Data

US 2012/0065931 A1    Mar. 15, 2012

(51) Int. Cl.
*G01R 35/00* (2006.01)

(52) U.S. Cl.
USPC ............... 702/170; 271/262; 271/265.04

(58) Field of Classification Search
CPC ............ B65H 2404/143; B65H 2404/14; B65H 2404/144; B65H 2404/147; B65H 2513/10; B65H 2513/11; G01B 21/10; G01B 21/12; H04N 1/00748; H04N 1/716
USPC ......................... 702/34, 36, 56, 170
See application file for complete search history.

(56) References Cited

U.S. PATENT DOCUMENTS

| | | | | |
|---|---|---|---|---|
| 5,078,384 | A * | 1/1992 | Moore | 271/228 |
| 5,184,811 | A * | 2/1993 | Sardella et al. | 271/10.11 |
| 5,313,253 | A * | 5/1994 | Martin et al. | 399/16 |
| 5,580,409 | A * | 12/1996 | Andersen et al. | 156/210 |
| 2003/0020231 | A1 * | 1/2003 | Williams et al. | 271/227 |
| 2005/0280205 | A1 * | 12/2005 | Knierim | 271/265.04 |
| 2006/0261540 | A1 * | 11/2006 | Loiselle et al. | 271/228 |
| 2007/0023994 | A1 * | 2/2007 | Mandel et al. | 271/226 |
| 2008/0258382 | A1 * | 10/2008 | deJong et al. | 271/265.02 |
| 2010/0067933 | A1 * | 3/2010 | Jones et al. | 399/66 |
| 2010/0135681 | A1 * | 6/2010 | Yanagi | 399/45 |
| 2011/0049801 | A1 * | 3/2011 | deJong et al. | 271/274 |

* cited by examiner

*Primary Examiner* — Mischita Henson

(57) ABSTRACT

An apparatus and method for measuring substrate media thickness including a nip assembly having a first nip for engaging substrate media and transporting the media along a process direction. The first nip has a nip velocity. A sensor is in operative communication with the first nip for sensing the nip velocity. A processor is operably connected to the sensor. The processor determines a media thickness responsive to a change in nip velocity detected by the velocity sensor upon entry of the media in the first nip.

16 Claims, 7 Drawing Sheets

SHEET THICKNESS MEASUREMENT APPARATUS

TECHNICAL FIELD

The present disclosure relates to a system for determining the thickness of a sheet of substrate media and more particularly a system for measuring sheet thickness based on a change in nip velocity.

BRIEF DESCRIPTION OF THE RELATED ART

In many document processing machines such as xerographic printers include sub-systems such as feeders, image transfer zones, fusers, decurlers, media transports, and media path controls. For such sub-systems it is beneficial to determine the properties of the sheet of media before the sheet enters the sub-systems. Two sheet properties of particular interest are sheet thickness and sheet stiffness. By knowing these properties, the sub-systems can be optimized to handle the sheets resulting in improved motion quality and image quality. For example, knowing sheet thickness in advance of printing may be used to control, adjust and/or optimize the operating parameters of a sheet separator/feeder for the particular stack of sheets. Parameters such as air knife levels, or frictional normal forces, and/or printer operating parameters such as various current or voltages applied to components of a xerographic printer, such as transfer currents, fuser temperatures, etc. may be varied for different print media sheet thicknesses or related basis weights. The sheet thickness may also be used for the control of printer output sheet finishers, such as folders, binders or booklet makers.

Accurately determining the thickness of a sheet is difficult in a document processing machine. Sheets of media are relatively thin and typically have a thickness less than a millimeter. Therefore, instruments used to measure sheet thickness must be precise and have a relatively small margin of error if any meaningful information is to result. It is known that print media thickness can be roughly measured by sensing displacement of something mechanically touching the print media. Options include a fixed (non-rolling) follower such as the pre-heater platelets used in solid ink printers, or a rolling follower. A fixed follower has the advantage of avoiding cyclic surface positional variations or vibrations due to "run-out" of its roller or shaft mounting with rotation. However, a fixed follower contacting the moving sheets surfaces must be inherently accurate or must be calibrated during manufacturing and field service, and may have drag, contamination, vibration, or other issues.

Devices which may typically be used to measure thickness, such as linear transducers, are susceptible also to vibrations generated during the normal operation of a document processing machine such as a copier or printer. Such vibration shows up as noise in the measurement and makes it difficult to determine the sheet thickness. Many sheets may need to be run through the system and statistical analysis performed before the sheet thickness could be determined with any acceptable degree of accuracy. In addition, an additional sensor such as a transducer would need to be added to the machine increasing the cost and complexity thereof.

Accordingly, it would be desirable to provide an apparatus for reliably and efficiently measuring sheet thickness in a document processing machine using an already existing component or subsystem.

SUMMARY

According to aspects described herein, there is disclosed an apparatus for measuring substrate media thickness including a nip assembly having a first nip for engaging substrate media and transporting the media along a process direction. The first nip has a nip velocity. A sensor is in operative communication with the first nip for sensing the nip velocity. A processor is operably connected to the sensor. The processor determines a media thickness responsive to a change in nip velocity detected by the velocity sensor upon entry of the media in the first nip.

According to other aspects described herein, there is provided a substrate media thickness measuring apparatus including a first nip assembly including a first nip having a drive roller and an idler roller. A biasing device urges the drive roller and idler roller together to develop a nip force. The first nip assembly transports substrate media in a process direction. A sensor is in operative communication with the first nip for sensing a nip velocity. A processor is operably connected to the sensor. The processor determines a media thickness responsive to the nip force and a change in nip velocity detected by the velocity sensor upon entry of the media into the first nip.

According to still further aspects described herein, there is provided a method of determining the thickness of substrate media in a document processing machine including:

transporting media through a nip assembly including a first nip for engaging substrate media and transporting the media in a process direction through the printing machine, the first nip having a nip velocity;

sensing the nip velocity; and determining the media thickness responsive to a change in the nip velocity.

DETAILED DESCRIPTION

Figure 1:
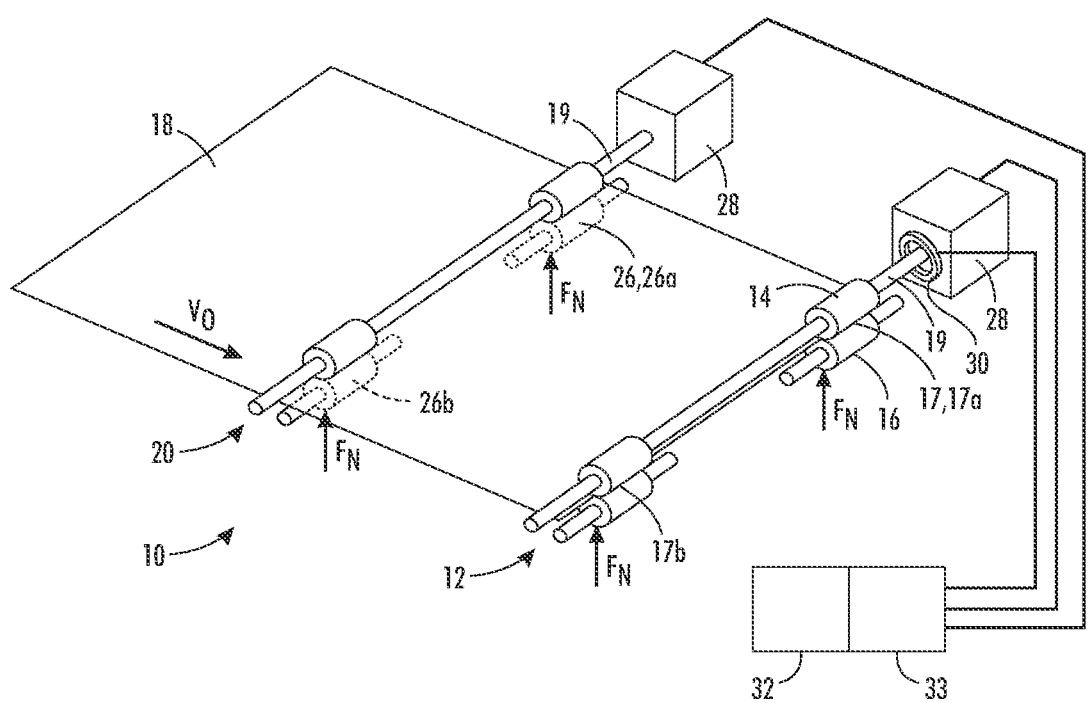
FIG. 1 is a perspective view of a nip assembly including a sheet thickness measuring apparatus.

Exemplary embodiments will now be described in further detail with reference to the Figures.

As used herein, "document processing machine" refers to one or more devices used to create or operate on documents including printing to generate "printouts" or a print outputting function, which refers to the reproduction of information on "substrate media" for any purpose. A "document processing machine" as used herein encompasses any apparatus, such as a printer, digital copier, bookmaking machine, facsimile machine, multi-function machine, etc.

A printer as referred to herein are synonymous and can use an "electrostatographic process" to generate printouts, which refers to forming and using electrostatic charged patterns to record and reproduce information, a "xerographic process," which refers to the use of a resinous powder on an electrically charged plate record and reproduce information, or other suitable processes for generating printouts, such as an ink jet process, a liquid ink process, a solid ink process, and the like. Also, a printer can print and/or handle monochrome or color image data, as well as transfer or impress marks by indenting or raising a surface.

As used herein, a "processor" can be a microprocessor or a computing device such as a mainframe, personal computer (PC), laptop computer, workstation, handheld device, such as a PDA, or the like, that includes a processing unit.

As used herein, the term "process direction" refers to a direction along a path associated with a process of printing or reproducing information on substrate media. The process direction is a flow path in which a substrate media is moved from one location to another within the document processing machine. A "cross-process direction" is generally perpendicular to the process direction. Also, use of the terms "upstream" or "downstream" use the process direction as a reference, with the downstream direction being synonymous with the process direction and the upstream direction being opposite thereto. Further, use of the terms "lateral" or "lateral direction" are synonymous with the cross-process direction.

As used herein, "substrate media" or "media" refers to, for example, paper, transparencies, parchment, film, fabric, plastic, or other substrates on which information can be reproduced, preferably in the form of a sheet or web.

As used herein, "sensor" refers to a device that responds to a physical stimulus and transmits a resulting impulse for the measurement and/or operation of controls. Such sensors include those that use pressure, light, motion, heat, sound and magnetism. Also, each of such sensors as referred to herein can include one or more point sensors and/or array sensors for detecting and/or measuring characteristics of a belt, image or substrate media, such as speed, orientation, process or cross-process position, size or even thickness. Thus, reference herein to a "sensor" can include more than one sensor.

As used herein, a "nip," refers to a subassembly that includes a drive roller and an idler roller. The drive rollers and idler rollers may be in the form of belts. When a sheet of media is being handled by the nip, the drive and idler rollers engage opposing faces of the sheet, thereby grabbing and moving the sheet through at least a portion of the printing machine.

As used herein, a "nip assembly," refers to one or more nips and the related drive components such as the nip drive including a motor and drive shaft. A number of nip assemblies may be disposed along a process path to move the media in the process direction.

As used herein, "nip velocity" refers to the speed of the nip component(s) which engage the media, such as the drive roller, in order to transport the media. The nip velocity may include the rotational velocity of the drive roller.

The apparatus for measuring the thickness of a sheet of substrate media disclosed herein uses an existing nip assembly such as a media path nip assembly, transfer nip assembly or fuser nip assembly equipped with a velocity sensor. With reference to FIG. 1, the sheet thickness measuring apparatus 10 includes a first downstream nip assembly 12 having at least one drive roller 14 and at least one opposed idler roller 16 forming a nip 17. The nip moves a sheet of media 18 in a process direction within a document processing machine. The nip assembly 12 may have similarly formed inboard and outboard nips 17a and 17b spaced form each other in a cross-process direction.

The first downstream nip assembly 12 may receive a sheet of substrate media 18 from an second upstream assembly 20. The upstream nip assembly 20 may have at least one drive roller 22 and at least one opposed idler roller 24 forming a nip 26. One or both of the drive roller and idler roller may be in the form of rotating belts. The nip upstream nip assembly 20 may have similarly formed inboard and outboard nips 26a and 26b. The drive rollers 14 and 22 may include an elastomeric outer surface and the idler rollers 16 and 24 may have a hard plastic outer surface of the type know in the art. For each nip assembly, the drive rollers may be operably connected to its own nip drive 28 via a drive shaft 19. The nip drive 28 may include a motor, stepper motor, or the like.

The downstream nip assembly 12 may include a rotational velocity sensor 30 which senses the nip velocity. Such nip velocity is the rotational velocity of the nip component(s) which engage the media, such as the drive roller, in order to transport the media in the process direction. The rotational velocity of the drive roller and idler roller will typically be the same since they are in rolling contact when a sheet of media is not present in the nip. When media is present in the nip, the rotation of the drive roller will be imparted to the idler roller through the sheet of media. Accordingly, the nip velocity can be sensed by monitoring the rotating nip components such as the drive or idler roller or shaft attached thereto. The velocity sensor 30 may be disposed on or adjacent to the drive shaft 19 so that the rotation of the shaft and thereby the drive roller 14 may be determined. The sensor 30 may include an encoder or tachometer of a type known in the art capable of detecting rotational velocity and generating a signal proportional to the detected velocity. In one embodiment, the sensor 30 may be disposed to sense the rotational velocity of the drive roller 14.

A controller 32 is operably connected to the velocity sensor 30 and nip drives 28 and performs calculations to derive the sheet thickness as a function of the sensed velocity. The controller 32 may include hardware and software and be integrated as one components or may be a plurality of separate components operably connected to each other. The controller 32 may include one or more processors 33 to carry out the desired calculations and elements for generating and receiving signals for controlling the operation of the nip drives.

Figure 2:
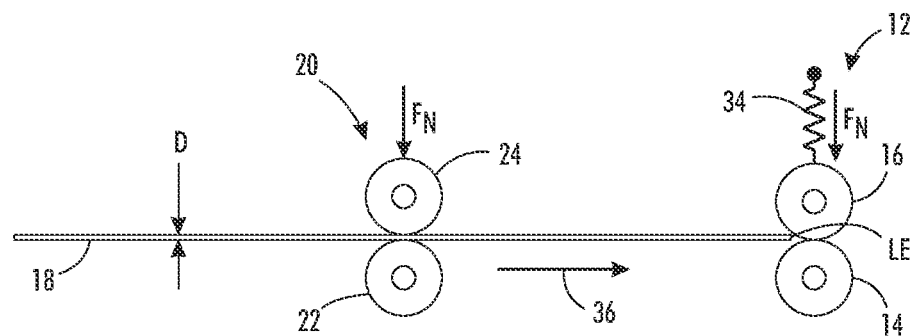
FIG. 2 is a schematic of a sheet prior to entering a nip.
Figure 3:
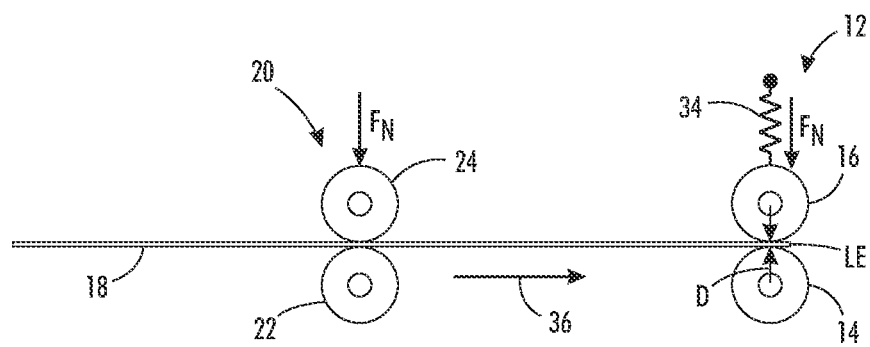
FIG. 3 is a schematic of a sheet after entering a nip.

With reference to FIGS. 2 and 3, a biasing device 34 such as a spring, urges the drive roller 14 and idler roller 16 together creating a nip force $F_N$ which is normal to the direction of sheet travel. As a sheet of media 18 enters the nip assembly 12 and is driven there through in a processing direction along a processing path indicated by arrow 36, the drive rollers 14 and idler rollers 16 are separated by the sheet 18 a distance D as it passes between the drive and idler rollers, 14 and 16. The distance D corresponds to the thickness of the sheet.

When a sheet of media 18 enters the inboard and outboard nips 17a and 17b, the work required to lift the nip components against the biasing force results in a decrease in rotational energy of the nip assembly and thus a decrease in the angular velocity of the nip assembly 12. Thus, a sheet of media 18 causes an almost instantaneous change in measured velocity whose amplitude is a function of sheet thickness. Specifically, with reference to FIGS. 1 and 3, when the nip assembly 12 is operated the nip drive 28 causes the drive roller 14 to turn which then drives the idler roller 16 which is in rolling contact therewith. As the drive roller 14 turns it has a certain predetermined angular velocity referred to as the nip velocity. When a sheet leading edge, LE, enters the nips 17a, 17b, there is a sudden, slight drop in nip velocity. This decrease in the nip velocity is due to rotational energy of the drive roller 14, idler roller 16, nip drive 28, and related drive components being converted to energy required to separate the idler roller 16 and drive roller 14 against the nip force $F_N$ a distance D equal to the sheet thickness. The measurement of this change in nip velocity is related to the sheet thickness, and then can therefore be used to determine sheet thickness.

Figure 4:
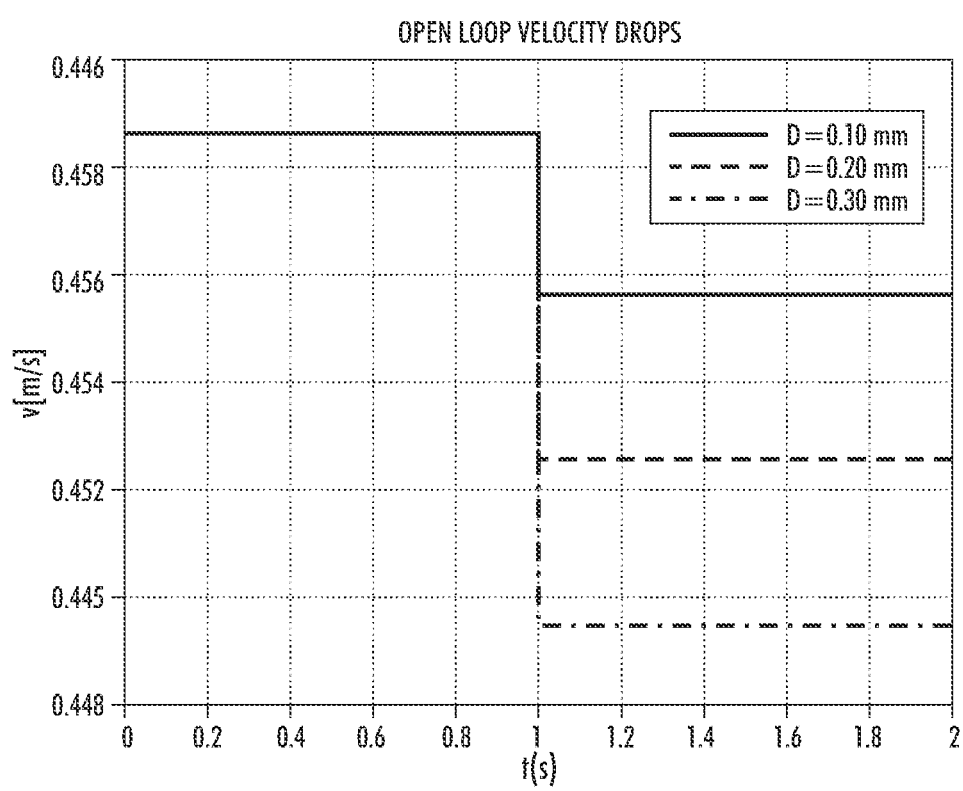
FIG. 4 is a graphical representation showing nip velocity over time for three different sheet thicknesses in an open loop nip system.

The correspondence between sheet thickness and sheet velocity is clearly illustrated in the graph of FIG. 4. The drop in nip velocity for three different sheet thicknesses is plotted over time. When the sheet leading edge enters the nip, the velocity decreases and remains low. The graph shows that the drop in nip velocity is dependant on the sheet thickness, with thicker sheet resulting in larger velocity drops.

This represents an open loop control situation wherein the velocity drop in the nips is not adjusted. Such a control system may be represented as follows:

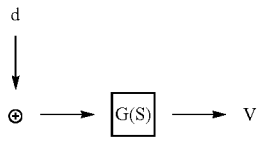

In this block diagram representation, d is the pulse or impulse acting on the nip drive, G(s) which causes the velocity drop.

With further reference to FIG. 3, when a sheet lead edge (LE) enters a media path nip assembly, the drive rollers 14 and idler rollers 16 forming the nips 17a and 17b separate slightly to accommodate the thickness of the sheet. The nip assembly may be a media path nip, transfer nip, or fuser nips. The energy needed to separate the nip components equals:

$$dE=2DF_N.$$ Equation 1

In this equation, the factor 2 is used in nip assemblies having 2 nips, i.e., 2 pairs of drive roller and idler roller (inboard & outboard) driving sheets in the media path and $F_N$ is the normal nip force at each individual nip. D is the separation distance which is equal to the sheet thickness.

When the sheet LE enters the nips, the energy required to separate the drive and idler rollers, dE, is supplied by the conversion of kinetic (rotational) energy of the nips rollers, and other nip assembly components, such as gear trains and motors, and sheet kinetic energy to potential energy used by the system when separating the nip rollers by a distance D. This leads to an instantaneous slow-down of the nips. This velocity decrease is sensed by sensor 30, and the rotational energy lost can be calculated by comparing the rotational energy before and after the sheet LE enters the nip. Accordingly, the sheet thickness can then be calculated in the processor 33 in controller 32 using the formula:

$$D=dE/2/F_N.$$ Equation 2

In the above embodiment, the kinetic energy of the system consists of the rotational energy of both nips 17a and 17b and their respective drive trains and motors. The kinetic energy of the system also includes the rotational energy of the upstream nip assembly 20, since the sheet 18 (assuming no buckling) couples the motion of upstream nip assembly, 1stNA, and the downstream nip assembly, 2ndNA. Therefore, the total rotational energy of the system equals the rotational energy of the first and second nip assemblies:

$$E_0=(\tfrac{1}{2}J_{tot}w_0^2)_{1stNA}+(\tfrac{1}{2}J_{tot}w_0^2)_{2ndNA}$$ Equation 3

If the nip assemblies are similarly formed, then the equation can be reduced to $$E_0=2(\tfrac{1}{2}J_{tot}w_0^2).$$ Equation 4

The total rotational energy of the system is then calculated after the media enters the nip.

$$E_{after}=2(\tfrac{1}{2}J_{tot}w_{after}^2).$$ Equation 5

The difference in the rotation energy may then be calculated.

$$\Delta E=2(\tfrac{1}{2}J_{tot}w_0^2)-2(\tfrac{1}{2}J_{tot}w_{after}^2)$$ Equation 6

The difference between the total rotational energy before the sheet enters the nips and after the sheet enters the nips, $\Delta E$, may be used in Equation 2 to determine the sheet thickness.

The sheet thickness may be determined as follows:

$$D=\Delta E/2F_N$$ Equation 7

Measuring the thickness by sensing the change in nip velocity can be achieved without adding additional components to the system. Sheet processing systems typically include velocity sensors to monitor the nip velocity to enable accurate nip velocity feedback control. For systems designed without such sensors, a low cost encoder can be mounted on a media path nip drive roller shaft (as shown in FIG. 1) or alternatively on an idler roller shaft. Accordingly, sheet thickness measurement can be reliably obtained in an economical manner.

In nip systems having open loop control, the nip velocity will drop and remain low as shown in FIG. 4. However, it is desirable to include a closed loop system in which the nip velocity is controlled such that it remains at a nominal predetermined value in order to maintain the throughput of the system. In a closed loop system, the controller 32 upon receiving signals from the velocity sensor 30 showing a change in the nip velocity adjusts the velocity of the drive rollers 14 to maintain the velocity of the sheet as it passes through the nips. When a sheet 18 enters the nips of the downstream nip assembly 12, the opening of the nips 17 does not happen instantaneously. For example, the opening takes place over about 2 mm of sheet travel and a corresponding period of time. Additionally, any sheet skew will spread out in time the separation of the inboard and outboard nip. Since the change in energy is spread out over time the controller 32 has time to react and send additional energy into the nip as the velocity drop is occurring, thereby changing the magnitude of the drop in nip velocity. The sheet thickness measuring apparatus 10 may also determine sheet thickness in such a closed loop nip system.

Figure 5:
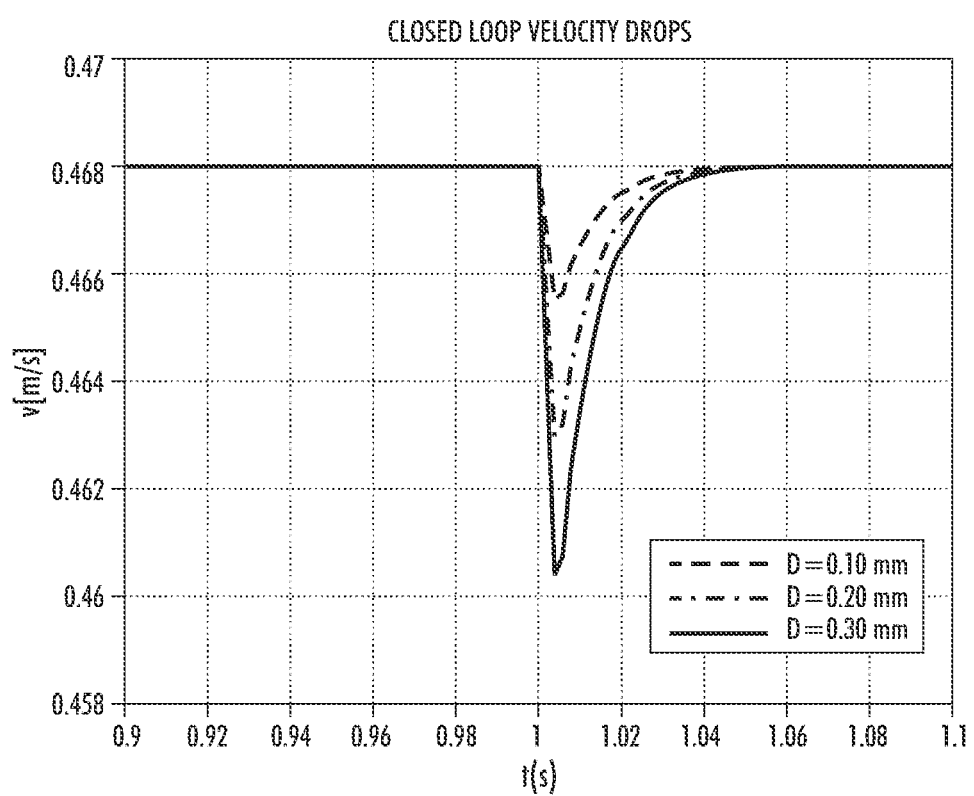
FIG. 5 is a graphical representation showing nip velocity over time for three different sheet thicknesses in a closed loop nip system.
Figure 6:
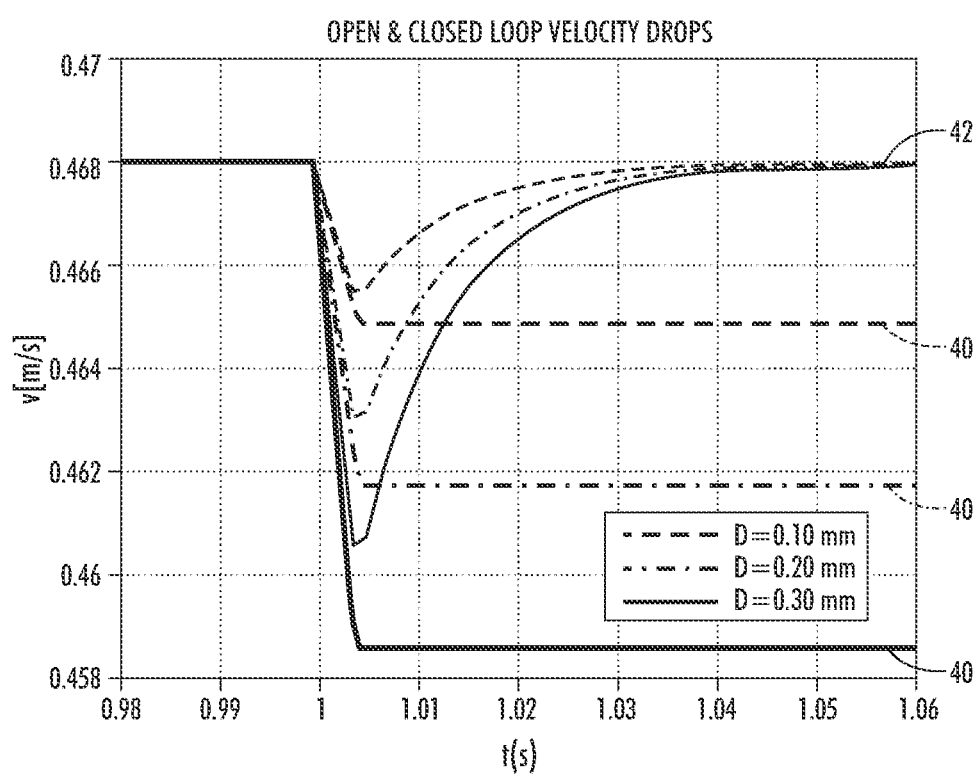
FIG. 6 is a graphical representation showing nip velocity over time for three different sheet thicknesses in a closed loop system and open loop system.

With reference to FIG. 5, in a closed loop system, when a drop in nip velocity is caused by the sheet LE entering a nip, the controller 32 will generate a signal causing the velocity of the nip drive 28 to be adjusted to bring the velocity back up to a predetermined nominal value. The nip velocity drop is short lived as the velocity is brought back to the nominal value within a few milliseconds. The nip velocity drop is therefore limited in amplitude in a closed loop system. A comparison of the velocity drops between the open loop control 40 and closed loop control 42 for various sheet thicknesses is graphically represented in FIG. 6.

Since in closed loop systems the nip velocity drop is relatively small and short in duration, it is desirable to determine the change in nip velocity as if it were an open loop system. Accordingly, a theoretical open loop nip velocity drop is calculated based on the actual sensed nip velocity of the closed loop system. The above Equations 1-7 can then be used to determine the sheet thickness based on a change in nip velocity. In order to determine the equivalent calculated change in nip velocity, the control system may be represented as follows:

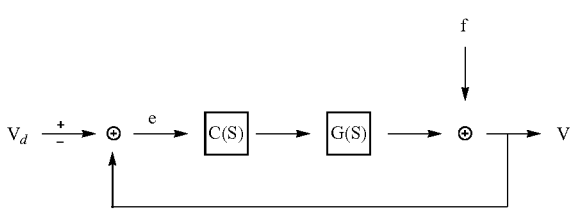

e is the velocity error C(S) represent the controller and G(S) represents the nip drive.

For an open loop system, in the Laplace domain $$D(S) = G^{-1}(S) \cdot \left(-\Delta V \cdot \frac{1}{S}\right)$$

With closed loop control
The transfer function f(t)→v(t)

$$G_{f \to V}(S) = \frac{V(S)}{F(S)} = \frac{1}{1 + C(S)G(S)}$$

The response to a media LE velocity drop with closed loop control is represented as:

$$V(s) = G_{f \to V}(S) \cdot F(S) =$$
$$= \frac{1}{1 + C(S)G(S)}(-\Delta V) \cdot \frac{1}{S}$$
$$= S(S) \cdot (-\Delta V) \cdot \frac{1}{S}$$

Where S is the sensitivity function.

Figure 7:
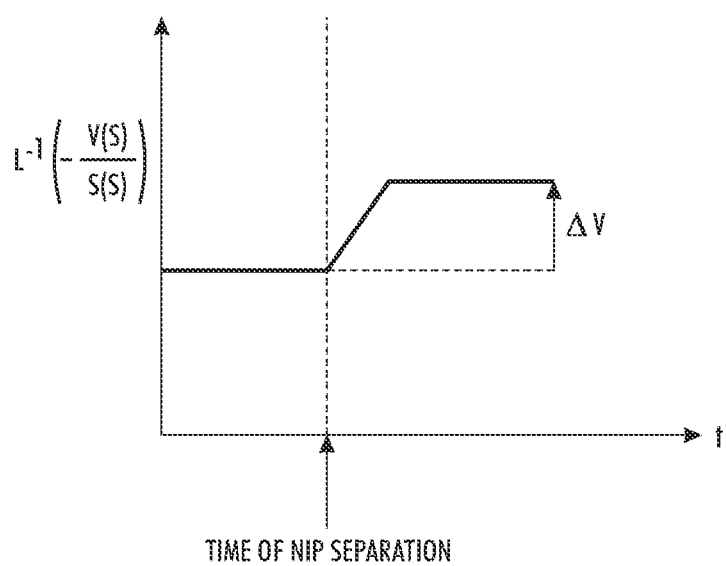
FIG. 7 is a graphical representation of a step function.

Experimentally, when v(t) is measured, the equivalent velocity drop, had the nip been under open loop control is:

$$\Delta V \cdot \frac{1}{S} = -\frac{1}{S(S)} \cdot V(S)$$

i.e. −V(s)/S(S) will have a step function at the time of the media LE enters the nip of magnitude ΔV as shown in FIG. 7.

Figure 8:
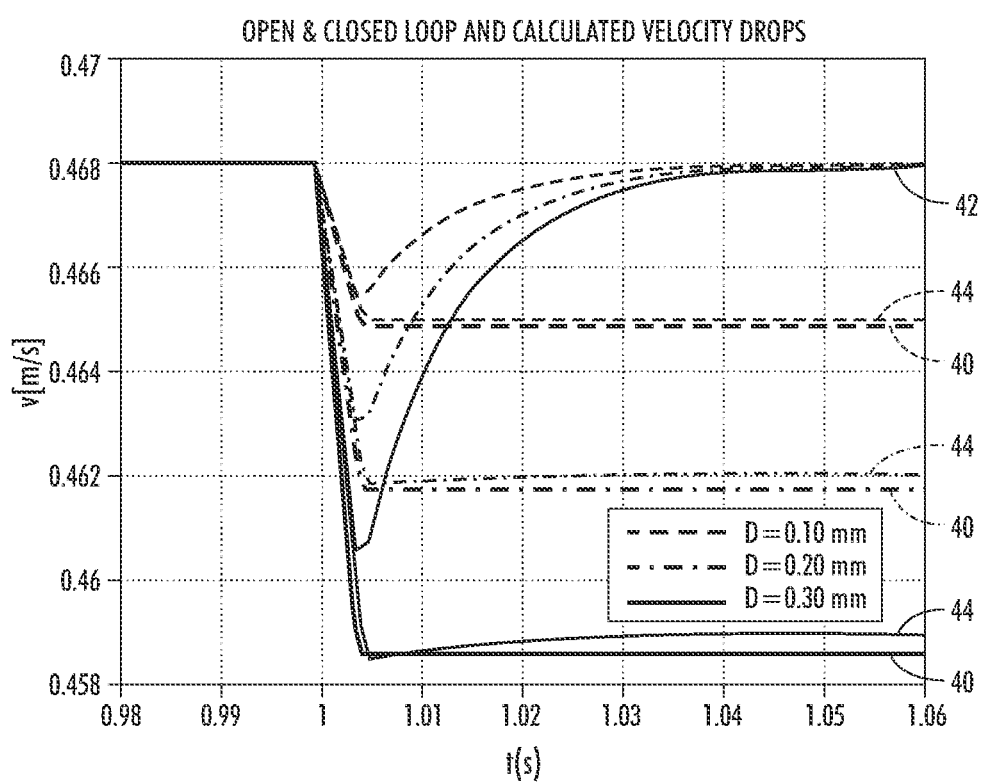
FIG. 8 a graphical representation showing nip velocity over time for three different sheet thicknesses for one and closed loop nip system and calculated theoretical open loop nip velocities.

With reference to FIG. 8, the calculated velocity drop 44 curves for the three sheet thicknesses is shown along with the actual closed loop 40 and open loop velocity drop curves 42. FIG. 8 shows that the calculated theoretical open loop velocity curves based on the closed loop system correlate closely to the actual open loop curves. The calculated theoretical open loop change in nip velocity can then be used to calculate the sheet thickness D in the manner noted above in Equations 1-7.

The sheet thickness measuring apparatus 10 provides a viable and accurate way to measure sheet thickness. Once the media thickness of the sheet is determined, parameters in the printing machine may be adjusted to optimize the processing of the media. The apparatus 10 has the advantage of requiring no other sensors or sensing elements to measure the sheet thickness. Such elements may protrude into the media path or contacting sheets, hence risking sheet damage. Additionally, the cost of harnessing and hardware for interfacing specific sheet thickness sensors can be avoided.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims, as originally presented and as they may be amended, encompass variations, alternatives, modifications, improvements, equivalents, and substantial equivalents of the embodiments and teachings disclosed herein, including other marking technologies such ink jet printing and those that are presently unforeseen or unappreciated, and that, for example, may arise from applicants/patentees and others.

What is claimed is:

1. A substrate media thickness measuring apparatus comprising:
   a first nip assembly including a first nip having a drive roller and an idler roller, and a biasing device urging the drive roller and idler roller together to generate a nip force, the first nip assembly transporting substrate media in a process direction;
   a sensor in operative communication with the first nip for sensing a nip velocity; and
   a processor operably connected to the sensor, the processor determining a media thickness responsive to the nip force generated by the biasing device and a change in nip velocity detected by the velocity sensor upon entry of the media into the first nip, wherein the nip velocity is the rotational velocity of the drive roller, and wherein the change in nip velocity is the difference in the rotational velocity of the drive roller before a leading edge of the media enters the first nip and the rotational velocity of the drive roller substantially coincident with the leading edge of the media fully entering the first nip.

2. The apparatus as defined in claim 1, wherein the change in nip velocity upon entry of media into the nip is determined over approximately 2 mm of media travel.

3. The apparatus as defined in claim 1, wherein the first nip assembly includes a second nip spaced from the first nip in a cross-process direction, the second nip including a drive roller and idler roller.

4. The apparatus as defined in claim 3, wherein a second nip assembly is disposed upstream of the first nip assembly, the second nip assembly including at least one drive roller and idler roller for advancing the media in the process direction.

5. The apparatus as defined in claim 1, wherein the processor calculates the media thickness, responsive to a change in kinetic energy resulting from the change in rotational velocity of the drive roller and the nip force.

6. The apparatus as defined in claim 5, wherein the kinetic energy includes the kinetic energy of the system including the rotational energy of the first nip and a drive train and motor operably connected thereto.

7. The apparatus as defined in claim 1, further including a nip drive operably connected to the drive roller for providing rotational movement to the drive roller.

8. The apparatus as defined in claim 7, further including a controller operably connected to the processor and the drive wherein the controller provides a signal to the drive to maintain a predetermined nip velocity.

9. The apparatus as defined in claim 1, wherein the processor generates a signal to cause the first nip to adjust velocity in response to the change in nip velocity to form a closed loop system and the processor calculates an estimated theoretical open loop nip velocity change responsive to sensed actual closed loop nip velocities.

10. The apparatus as defined in claim 1, wherein the nip force is normal to the process direction.

11. The apparatus as defined in claim 1, wherein the biasing device is a spring.

12. A method of determining the thickness of substrate media in a printing machine comprising:
transporting media through a nip assembly including a first nip for engaging substrate media with a nip force, the first nip having a drive roller and a idler roller and a biasing device urging the drive roller and the idler roller together to generate a nip force, and transporting the media in a process direction through the printing machine, the first nip having a nip velocity, the nip velocity being a rotational velocity of the drive roller;
sensing the nip velocity with a sensor; and
determining with a processor the media thickness responsive to a change in kinetic energy of the nip assembly determined as a function of the rotational velocity of the drive roller in response to the media entering the nip, and the nip force generated by the biasing device, and wherein the change in kinetic energy of the nip assembly is the difference in the kinetic energy before a leading edge of the media enters the first nip and the rotational velocity of the drive roller substantially coincident with the leading edge of the media fully entering the first nip.

13. The method of claim 12, wherein determining the media thickness includes determining a calculated theoretical open loop change in nip velocity based on a sensed change in nip velocity in a closed loop system.

14. The method of claim 12, wherein the kinetic energy of the nip is derived from the rotational energy of the first nip and a drive train and motor operably connected thereto.

15. The method of claim 14, wherein the kinetic energy of the nip is derived from a rotational energy of an upstream nip assembly.

16. A substrate media thickness measuring apparatus comprising:
a first nip assembly including a first nip having a drive roller and an idler roller, and a biasing device urging the drive roller and idler roller together to generate a nip force, the first nip assembly transporting substrate media in a process direction;
a sensor in operative communication with the first nip for sensing a nip velocity; and
a processor operably connected to the sensor, the processor determining a media thickness responsive to the nip force generated by the biasing device and a change in nip velocity detected by the velocity sensor upon entry of the media into the first nip, wherein the nip velocity is the rotational velocity of the drive roller, and wherein the change in nip velocity is the difference in the rotational velocity of the drive roller before a leading edge of the media enters the first nip and after the leading edge of the media enters the first nip, and the processor generates a signal to cause the first nip to adjust velocity in response to the change in nip velocity to form a closed loop system and the processor calculates an estimated theoretical open loop nip velocity change responsive to sensed actual closed loop nip velocities.

\* \* \* \* \*